(12) United States Patent
Alberto (10) Patent No.: US 10,168,969 B2
(45) Date of Patent: Jan. 1, 2019

(54) INFORMATION PROCESSING APPARATUS, NON-TRANSITORY COMPUTER READABLE RECORDING MEDIUM THAT RECORDS PRINTER DRIVER PROGRAM, AND BLANK PAGE HANDLING METHOD

(71) Applicant: KYOCERA DOCUMENT SOLUTIONS INC., Osaka (JP)

(72) Inventor: Hershe Alberto, Concord, CA (US)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 15/456,682

(22) Filed: Mar. 13, 2017

(65) Prior Publication Data

US 2018/0260177 A1 Sep. 13, 2018

(51) Int. Cl.
*G06F 3/12* (2006.01)
*H04N 1/00* (2006.01)

(52) U.S. Cl.
CPC .......... *G06F 3/1254* (2013.01); *G06F 3/1205* (2013.01); *G06F 3/125* (2013.01); *G06F 3/1208* (2013.01); *G06F 3/1244* (2013.01); *H04N 1/00726* (2013.01); *H04N 1/00761* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2006/0158688 A1* | 7/2006 | Mori | H04N 1/00238 358/1.15 |
| 2011/0267643 A1 | 11/2011 | Mastie et al. | |
| 2011/0270688 A1 | 11/2011 | Dew et al. | |
| 2017/0149999 A1* | 5/2017 | Jeevanantham | H04N 1/32133 |

FOREIGN PATENT DOCUMENTS

EP 0768000 A1 4/1997

* cited by examiner

*Primary Examiner* — Moustapha Diaby
(74) *Attorney, Agent, or Firm* — Li & Cai Intellectual Property (USA) Office (57) ABSTRACT

An information processing apparatus includes circuitry configured to set a blank page handling feature, detect a blank page/blank pages in a document of a print job, and handle the detected blank page/blank pages in the document based on the set blank page handling feature.

17 Claims, 10 Drawing Sheets

INFORMATION PROCESSING APPARATUS, NON-TRANSITORY COMPUTER READABLE RECORDING MEDIUM THAT RECORDS PRINTER DRIVER PROGRAM, AND BLANK PAGE HANDLING METHOD

BACKGROUND OF THE INVENTION

1. Field of the Invention

The present disclosure relates to an information processing apparatus, a blank page handling method, and a non-transitory computer readable recording medium that records a printer driver program, that handle blank pages in a document of a print job.

2. Description of Related Art

There are cases when documents have blank pages that are left intentionally blank for the purposes of document formatting and layout to fill spaces or separate contents. Some documents mark the blank pages such as standardized tests and classified documents.

Currently, most printer drivers support skipping of blank pages in a document. This could be extended to support more handling that would apply to blank pages to efficiently and easily edit them according to their purpose in their document.

SUMMARY OF THE INVENTION

According to an embodiment of the present disclosure, an information processing apparatus includes: circuitry configured to set a blank page handling feature, detect a blank page/blank pages in a document of a print job, and handle the detected blank page/blank pages in the document based on the set blank page handling feature.

According to an embodiment of the present disclosure, a non-transitory computer readable recording medium records a printer driver program, the printer driver program causing a computer to set a blank page handling feature, detect a blank page/blank pages in a document of a print job, and handle the detected blank page/blank pages in the document based on the set blank page handling feature.

According to an embodiment of the present disclosure, a blank page handling method includes: setting a blank page handling feature; detecting a blank page/blank pages in a document of a print job; and handling the detected blank page/blank pages in the document based on the set blank page handling feature.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, an embodiment of the present disclosure will be described with reference to the drawings.

1. Configuration of Blank Page Handling System

Figure 1:
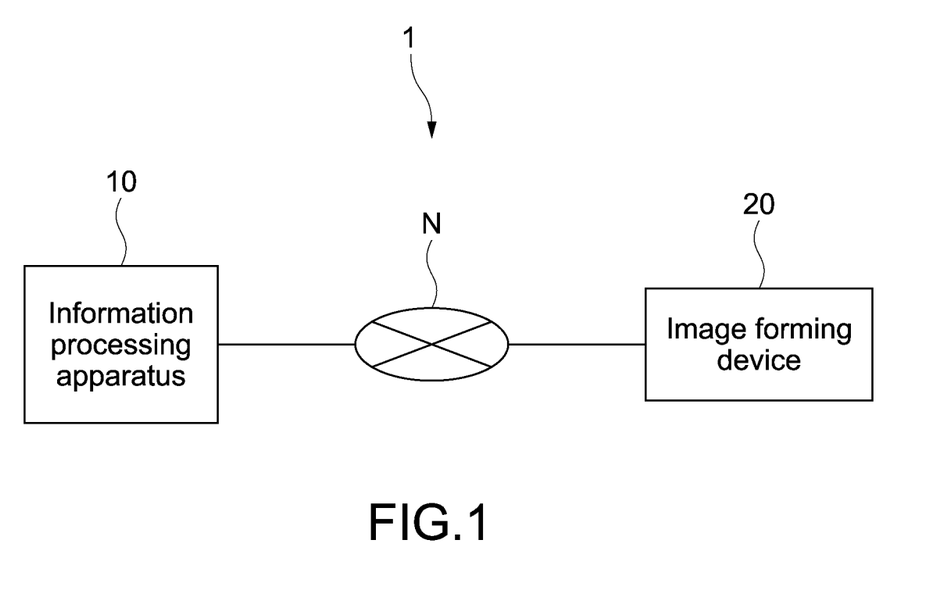
FIG. 1 shows a blank page handling system according to an embodiment of the present disclosure.

FIG. 1 shows a blank page handling system according to an embodiment of the present disclosure.

The blank page handling system 1 includes the information processing apparatus 10 and the image forming device 20. The information processing apparatus 10 and the image forming device 20 are connected to the network N. The information processing apparatus 10 and the image forming device 20 are capable of communicating with each other via the network N. The network N is, for example, an LAN (Local Area Network) in an office. The information processing apparatus 10 and the image forming device 20 are installed in the office.

The information processing apparatus 10 is, for example, an information terminal such as a personal computer that a worker (user) at the office uses. The information processing apparatus 10 supplies print jobs to the image forming device 20 via the network N.

The image forming device 20 is a multifunction peripheral (MFP), for example. The image forming device 20 obtains the print jobs from the information processing apparatus 10 via the network N and executes the print jobs.

2. Hardware Configuration of Information Processing Apparatus

Figure 2:
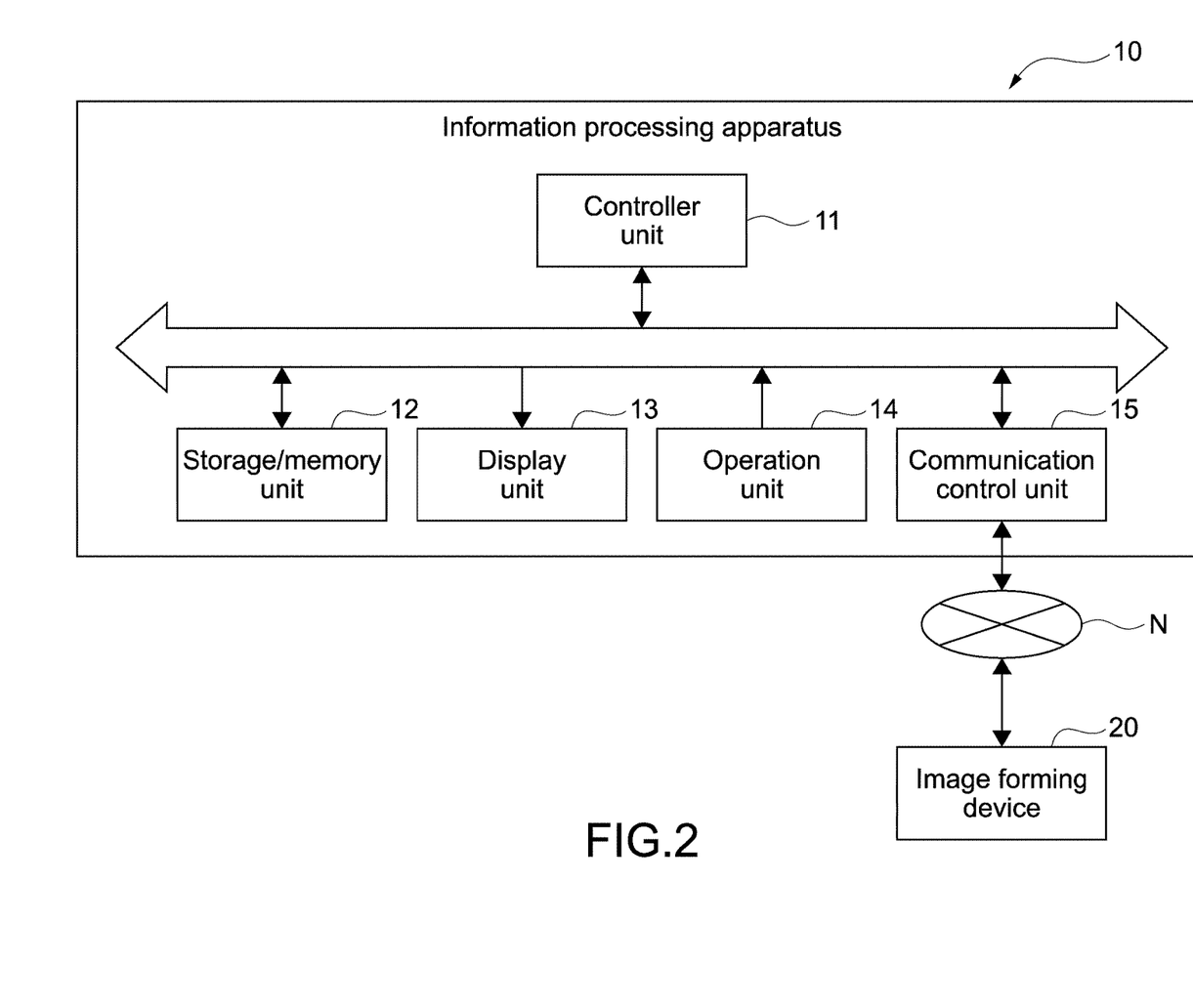
FIG. 2 shows a hardware configuration of the information processing apparatus.

FIG. 2 shows a hardware configuration of the information processing apparatus.

The information processing apparatus 10 includes the controller unit 11, and the storage/memory unit 12, the display unit 13, the operation unit 14, and the communication control unit 15 connected to the controller unit 11 via the bus 16.

The controller unit 11 includes CPU (Central Processing Unit) and the like. The CPU of the controller unit 11 loads programs such as a printer driver recorded in a ROM (Read Only Memory), which is an example of a non-transitory computer readable recording medium, into a RAM (Random Access Memory) and executes the programs such as the printer driver.

The storage/memory unit 12 includes the ROM, the RAM, and large-volume storage such as an HDD (Hard Disk Drive). The ROM fixedly records the programs executable by the controller unit 11, data, and the like. The programs recorded in the ROM is loaded into the RAM.

The display unit 13 includes an LCD (Liquid Crystal Display), an organic EL (Electroluminescence) display, or the like. The display unit 13 performs arithmetic processing based on information supplied from the controller unit 11, and outputs generated image signals. Typically, the display unit 13 is an external display apparatus.

The operation unit 14 includes a keyboard, a mouse, various switches, and the like. The operation unit 14 detects operation by a user, and outputs detection signals to the controller unit 11.

The communication control unit 15 is an interface for connecting to the network N to which the image forming devices 20 are connected.

3. Overview of Printer Driver

Figure 3:
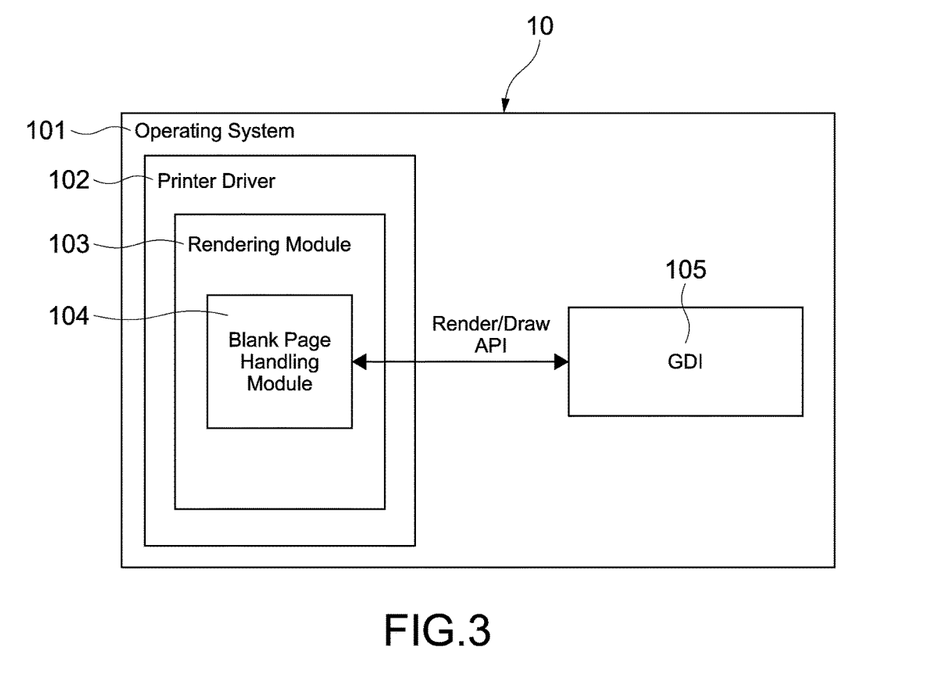
FIG. 3 schematically shows an overview of the printer driver that the information processing apparatus executes.

FIG. 3 schematically shows an overview of the printer driver that the information processing apparatus executes.

In the information processing apparatus 10, the operating system (OS) 101 is system software that manages computer hardware 11 to 15 and software resources including the printer driver 102.

The printer driver 102 is software that converts data to be printed, which is created by application (e.g., Microsoft Word, Excel, PowerPoint (registered trademark), etc.), to the form specific to the image forming devices 20. The printer driver 102 has the rendering module that interfaces with Microsoft Windows (registered trademark) Graphics Device Interface (GDI) 105 to handle print job rendering to retrieve page data and draw images (bitmaps/vectors) and texts (characters/fonts) accordingly.

The GDI 105 is an application programming interface (API) and a core operating system component responsible for rendering/drawing graphical objects and transmitting the graphical objects to the image forming device 20.

The blank page handling module 104 is added in the rendering module 103 of the printer driver 102 to perform blank page detection and auto-insertion of markings in blank pages (to be described in detail below). Note that the "markings" include not only figures and labels, i.e., images with or without texts, but also texts, i.e., text data (typographical fonts) without an image. In other words, examples of the "markings" include all of text data without an image, an image without text data, and an image with text data.

4. Overview of Blank Page Handling Method

The blank page handling module 104 has a feature to handle marking and labelling blank pages in documents during printing according to the blank page handling features. The blank page handling module 104 includes the following three features (1) to (3). Note that the blank page handling module 104 is capable of setting one of (1) to (3), two of (1) to (3), or all of (1) to (3).

(1) First, the blank page handling module 104 performs auto-insertion of predefined or custom markings in all blank pages in the print job (e.g., predefined: "This page intentionally left blank", "Blank"). This can be inserted with the following options, i.e., watermark-style (with low print density, i.e., gray color with 25% opacity) or normal style.

Figure 4:
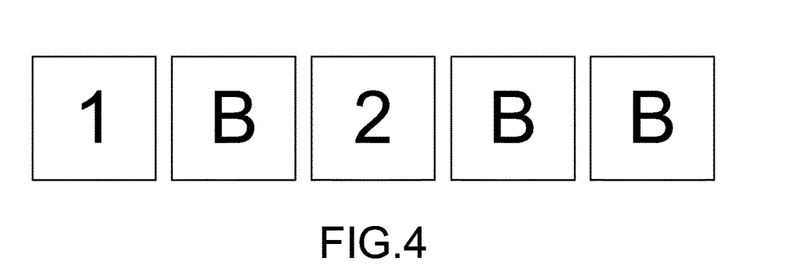
FIG. 4 illustrates an example original printout that can be used to illustrate the first feature (auto-insertion of markings in all blank pages) of the blank page handling module.
Figure 5:
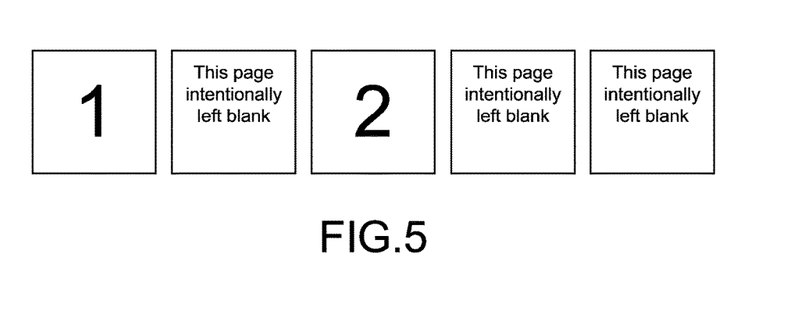
FIG. 5 illustrates an example of the first feature (auto-insertion of markings in all blank pages) of the blank page handling module.
Figure 6:
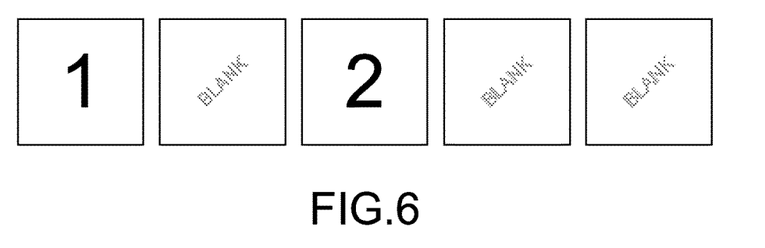
FIG. 6 illustrates an example of the first feature (auto-insertion of markings in all blank pages) of the blank page handling module.

FIG. 4 illustrates an example original printout that can be used to illustrate the first feature (auto-insertion of markings in all blank pages) of the blank page handling module. FIG. 5 and FIG. 6 illustrate examples of the first feature (auto-insertion of markings in all blank pages) of the blank page handling module.

As shown in FIG. 4, a sample of an original simplex printout includes the page 1 with print data, the blank page B, the page 2 with print data, and the two consecutive blank pages B, B, in this order.

As shown in FIG. 5, the sample text "This page intentionally left blank." in the normal text style is auto-inserted in all the blank pages B of the original simplex printout of FIG. 4.

As shown in FIG. 6, alternatively, the sample text "Blank" in the watermark text style is auto-inserted in all the blank pages B of the original simplex printout of FIG. 4.

(2) Second, the blank page handling module 104 performs auto-insertion of predefined or custom markings in the n-th (in the following description, "1st" will be described as an example) blank page of a series of consecutive blank pages (e.g., predefined: "Next page is blank", "Backside is blank"). These serve as warnings to prevent unnecessary flipping to the next blank page.

The second feature (2) includes the following sub features (2-1) and (2-2).

(2-1) When simplex, the 1st blank page of a series of consecutive blank pages is marked, which will be described with reference to FIG. 7.

(2-2) When duplex, the 1st blank page of a duplex pair of blank pages is marked, which will be described with reference to FIG. 8 and FIG. 9.

Figure 7:
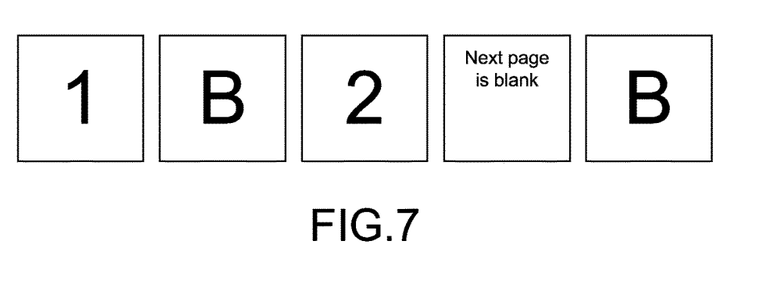
FIG. 7 illustrates an example of the second feature (auto-insertion of markings in 1st blank page of consecutive blank pages) of the blank page handling module.
Figure 8:
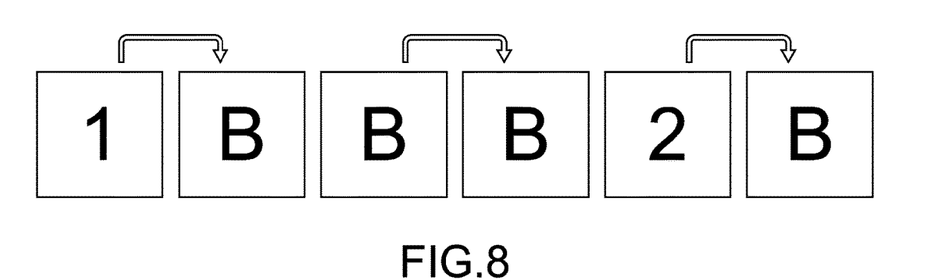
FIG. 8 illustrates an example original printout that can be used to illustrate the second feature (auto-insertion of markings in 1st blank page of consecutive blank pages) of the blank page handling module.
Figure 9:
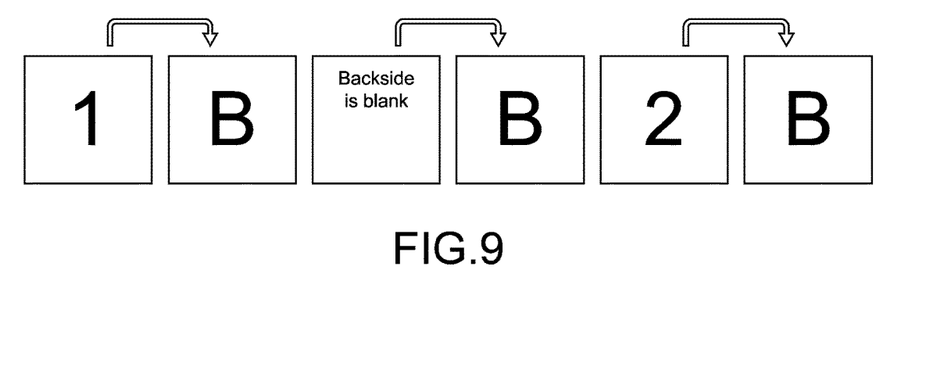
FIG. 9 illustrates an example of the second feature (auto-insertion of markings in 1st blank page of consecutive blank pages) of the blank page handling module.

FIG. 7 to FIG. 9 illustrate examples of the second feature (auto-insertion of texts in 1st blank page of consecutive blank pages) of the blank page handling module, in which FIG. 8 illustrates an example original printout that can be used to illustrate the second feature (auto-insertion of markings in 1st blank page of consecutive blank pages) of the blank page handling module.

As shown in FIG. 7, the sample predefined text "Next page is blank" in the normal text style is auto-inserted in the 1st blank page B of a series of two consecutive blank pages B, B of the original simplex printout of FIG. 4.

As shown in FIG. 8, a sample of an original duplex printout includes the page 1 with print data, the three consecutive blank pages B, B, B, the page 2 with print data, and the blank page B, in this order. Each arrow means that the pair of pages connected by one arrow are a duplex pair of pages.

As shown in FIG. 9, the sample predefined text "Backside is blank" in the normal text style is auto-inserted in the 1st blank page of a duplex pair of blank pages B, B of the original duplex printout of FIG. 8.

(3) Third, the blank page handling module 104 allows to print only a certain number of blank pages in a series of consecutive blank pages in a print job according to user set maximum allowable blank pages (e.g., Allow to print only up to 3 consecutive blank pages).

Figure 10:
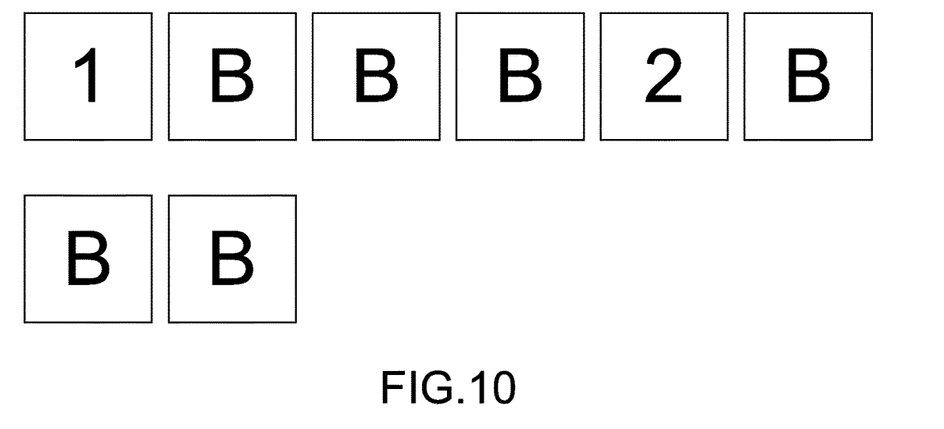
FIG. 10 illustrates an example original printout that can be used to illustrate the third feature (allowing to print only a certain number of blank pages in consecutive blank pages) of the blank page handling module.
Figure 11:
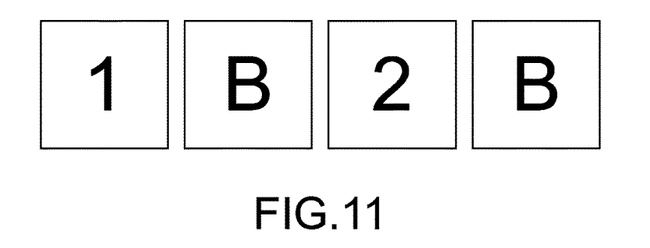
FIG. 11 illustrates an example of the third feature (allowing to print only a certain number of blank pages in consecutive blank pages) of the blank page handling module wherein maximum allowable consecutive blank pages is 1.

FIG. 10 illustrates an example original printout that can be used to illustrate the third feature (allowing to print only a certain number of blank pages in consecutive blank pages) of the blank page handling module. FIG. 11 illustrates an example of the third feature (allowing to print only a certain number of blank pages in consecutive blank pages) of the blank page handling module wherein maximum allowable consecutive blank pages is 1.

As shown in FIG. 10, a sample of an original multiple blank pages printout includes the page 1 with print data, the three consecutive blank pages B, B, B, the page 2 with print data, and the three consecutive blank pages B, B, B, in this order.

As shown in FIG. 11, the blank page handling module 104 allows to print the blank page max=1 blank page B in each consecutive blank pages B, B, B. The rest blank pages B, B are auto-skipped, i.e., deleted. Note that markings will be added to un-skipped blank pages B, B.

5. Operation Flow of Information Processing Apparatus

Figure 12:
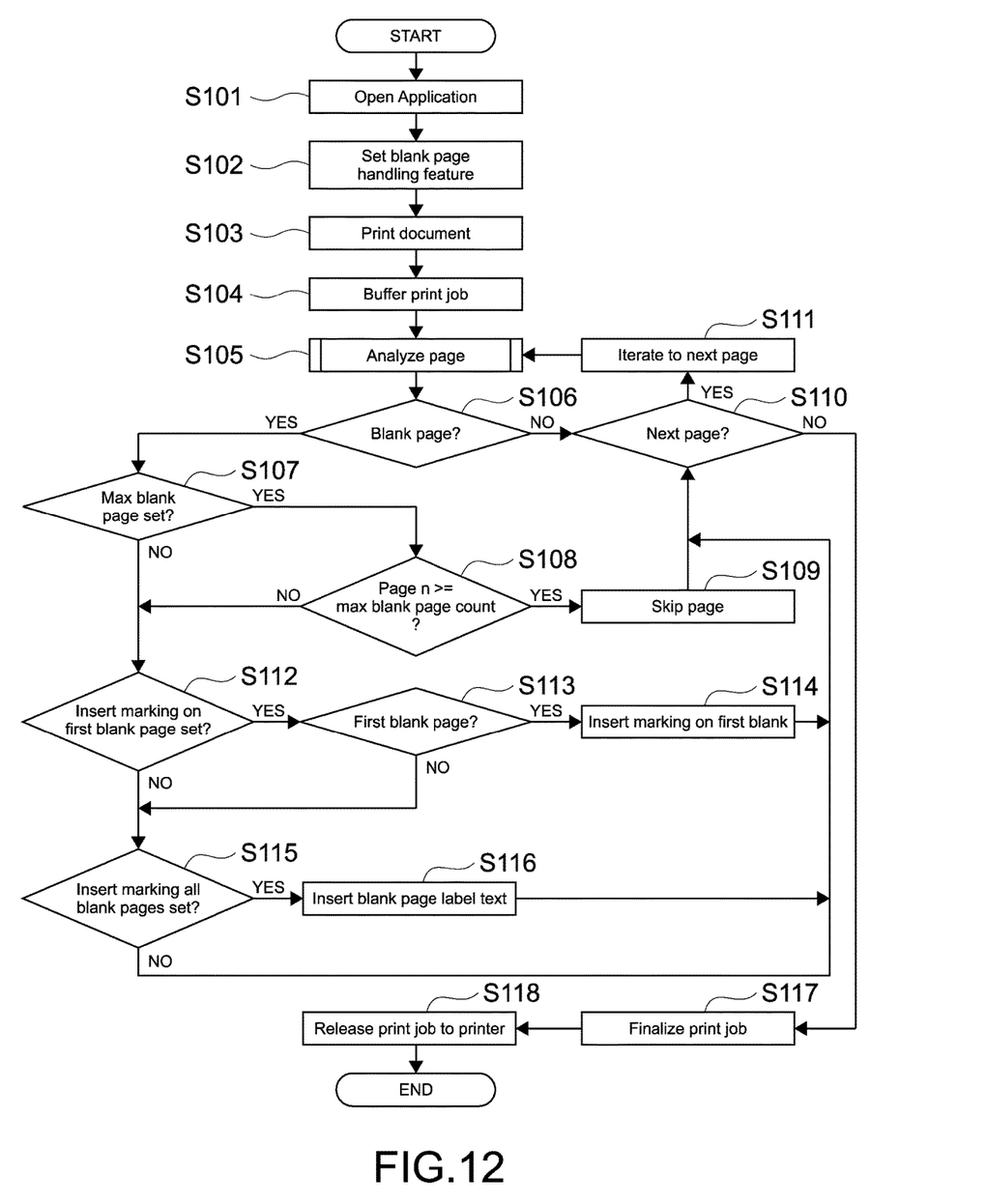
FIG. 12 shows an operation flow of the information processing apparatus.

FIG. 12 shows an operation flow of the information processing apparatus.

An application (e.g., Microsoft Word, Excel, PowerPoint (registered trademark), etc.) sends a print job to the printer driver 102 to open the printer driver 102 (Step S101). The printer driver 102 selects and starts the blank page handling module 104.

The blank page handling module 104 sets one blank page handling feature (Step S102). Specifically, the blank page handling module 104 selects one, two, or all the feature/features of (1) to add marking data in all the blank pages, (2) to add marking data only in the 1st blank page of consecutive blank pages, and (3) to allow to print only a certain number of blank pages in consecutive blank pages. Further, the blank page handling module 104 selects predefined marking or set custom marking for each feature, and sets text properties (normal, watermark, etc.) for each feature.

The rendering module 103 starts to print the document (Step S103). The rendering module 103 buffers the job (Step S104), and starts to get/retrieve and analyze each page, i.e., one by one, according to data content and the location or position, i.e., the page number, in the document (Step S105).

Figure 13:
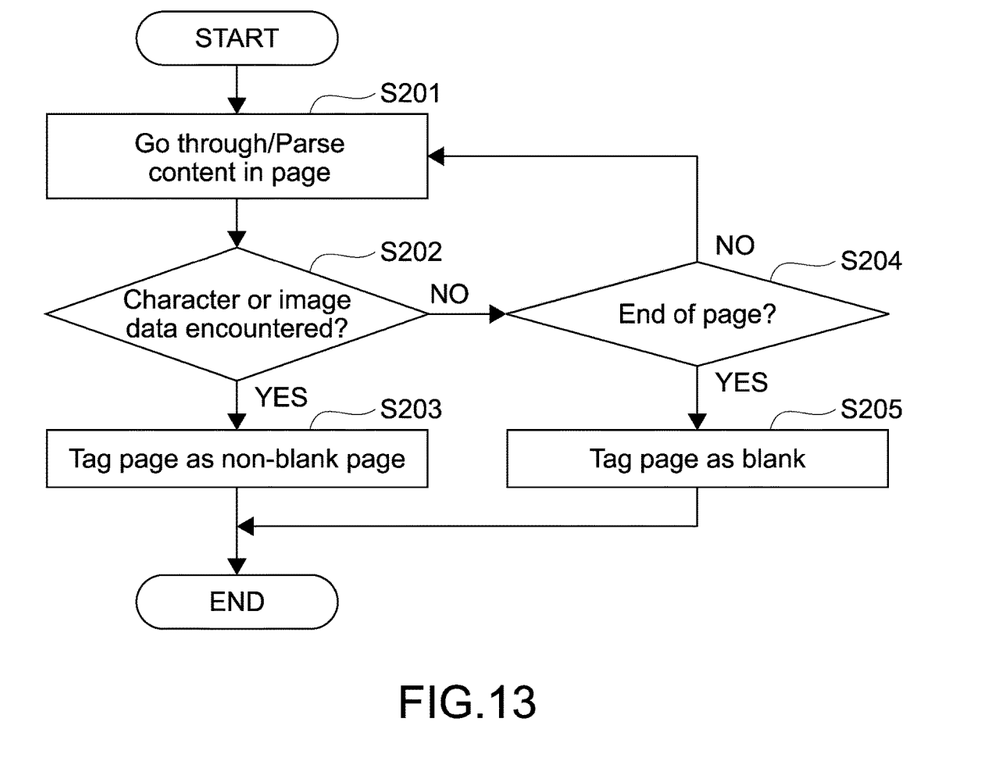
FIG. 13 shows an operation flow of how to detect blank pages.

FIG. 13 shows an operation flow of how to detect blank pages in Step S105.

The rendering module 103 goes through, traverses, and parses each page content (Step S201). If the rendering module 103 encounters a message to draw a text or an image (Step S202, YES), the rendering module 103 considers the current page as a non-blank page, and tags the current page as a non-blank page (Step S203). If the rendering module 103 encounters no message to draw a text or an image (Step S202, NO) and reaches an end page message (Step S204, YES), the rendering module 103 considers the current page as a blank page, and tags the current page as a blank page (Step S205).

With reference to FIG. 12 again, the blank page handling module 104 determines the current page that it is blank if no data content is found in the current page (Step S106). If data content is found in the current page, the blank page handling module 104 determines that the current page is not a blank page and then analyzes the next page (Step S110, YES, and Step S111).

Upon encountering a blank page (Step S106, YES), the blank page handling module 104 checks if the maximum consecutive blank page number feature is set (Step S107). If the maximum consecutive blank page number feature is set (Step S107, YES), the blank page handling module 104 determines the current blank page number "n" and checks if the current blank page number "n" is within the number of allowable consecutive blank pages, i.e., the maximum consecutive blank page number (Step S108). Note that the current blank page number "n" means not the sequential "actual page number" within the entire document but the "blank page number" within a series of consecutive blank pages. Note that a sample process of numbering the blank page number will be described later with reference to FIG. 14, and a sample process of checking if a blank page number is within the maximum allowable blank pages will be described later with reference to FIG. 15. If the current blank page number is not within the maximum allowable number of consecutive blank pages (Step S108, YES), the blank page handling module 104 skips, i.e., deletes, the current blank page (Step S109), and then analyzes the next page (Step S110, YES, and Step S111).

If the current blank page number is within the maximum allowable number of consecutive blank pages (Step S108, NO), or if the maximum consecutive blank page number feature is not set (Step S107, NO), the blank page handling module 104 checks if the auto-insertion of marking on the 1st blank page is set (Step S112). If the auto-insertion of marking on the 1st blank page is set (Step S112, YES), the blank page handling module 104 then checks the current blank page number if the current blank page number is the 1st blank page of a set of consecutive blank pages (Step S113). If the current blank page number is the 1st blank page (Step S113, YES), the blank page handling module 104 inserts the marking specified in the feature for the 1st blank page in the current blank page (Step S114). The rendering module 103 draws the specified marking, and tags the current blank page as a blank page with the specified marking. Then the blank page handling module 104 analyzes the next page (Step S110, YES, and Step S111).

If the current blank page number is not the 1st blank page (Step S113, NO), or if the auto-insertion of marking on the 1st blank page is not set (Step S112, NO), the blank page handling module 104 checks if the auto-insertion of the marking in all blank pages feature is set (Step S115). If the auto-insertion of the marking in all blank pages feature is set (Step S115, YES), the blank page handling module 104 inserts the marking specified in the feature for all blank pages in the current blank page (Step S116). The rendering module 103 draws the specified marking, and tags the current blank page as a blank page with the specified marking. Then the blank page handling module 104 then analyzes the next page (Step S110, YES, and Step S111).

If the auto-insertion of the marking in all blank pages feature is not set (Step S115, NO), the blank page handling module 104 then analyzes the next page (Step S110, YES, and Step S111).

After the blank page handling module 104 processes all the pages (Step S110, NO), the printer driver 102 finalizes the print job (Step S117) and releases the print job to the printer (Step S118) to be printed out by the image forming device 20.

6. Sample Process of Numbering Blank Page Number

Figure 14:
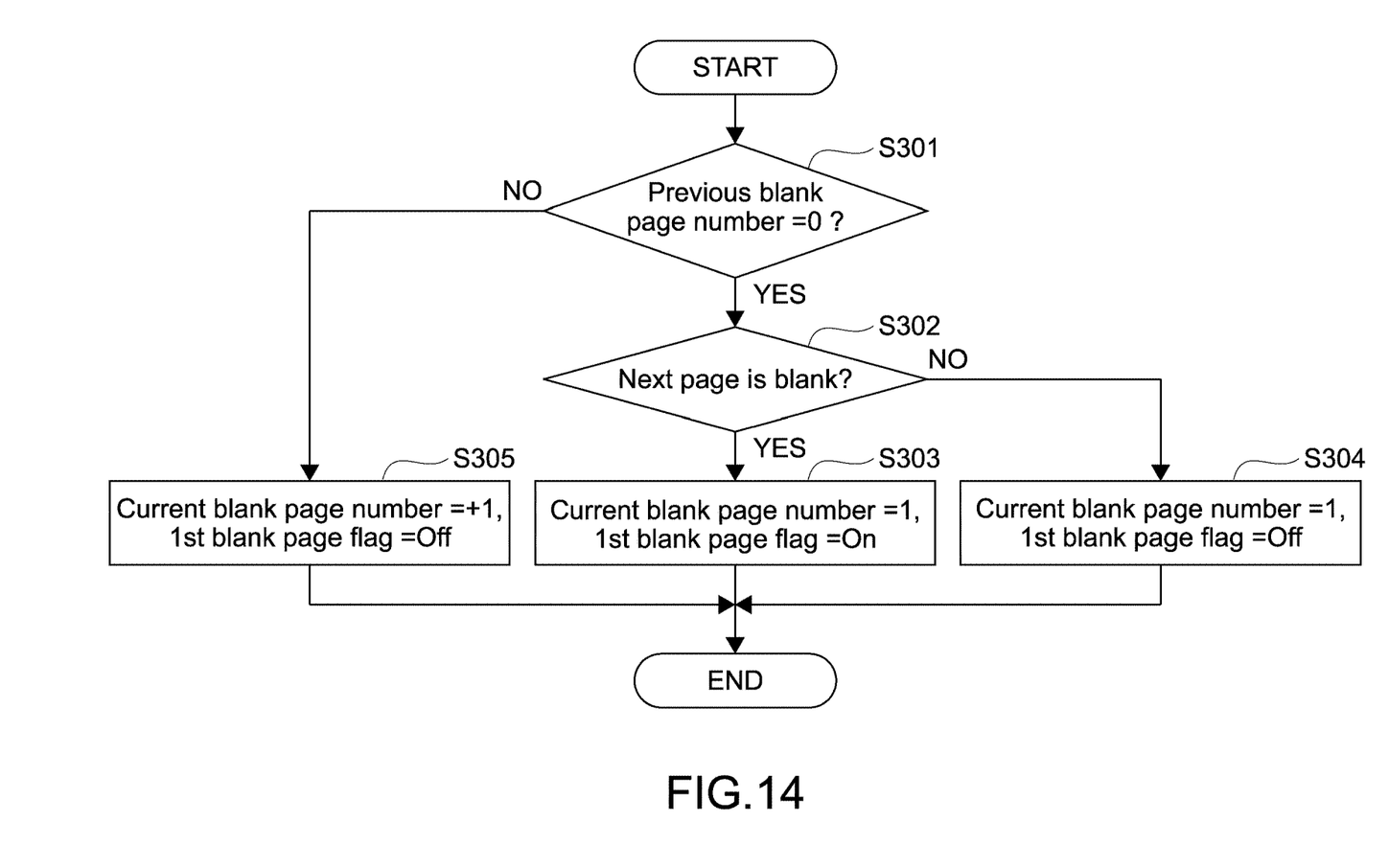
FIG. 14 shows a sample process of numbering the blank page number according to its position (i.e., blank page number) in a blank page set.

FIG. 14 shows a sample process of numbering the blank page number according to its position (i.e., blank page number) in a blank page set.

To get the current blank page number, the blank page handling module 104 checks the previous blank page number (Step S301). If the previous blank page number is 0 (which means that previous page is not blank) (Step S301, YES), the blank page handling module 104 sets the current blank page number to 1.

To determine if the current blank page is the 1st blank page of a blank page set, the blank page handling module 104 further checks the next page (Step S302). If the next page is blank (Step S302, YES), the blank page handling module 104 determines that the current blank page is a part of a set of consecutive blank pages. In this case, the 1st blank page flag is set to On (Step S303).

If the previous blank page is 0 (Step S301, YES) and the next page is NOT blank (Step S302, NO), the blank page handling module 104 determines that the current blank page is NOT a part of a set of consecutive blank pages (which means that the current blank page is a single blank page independent of a set of consecutive blank pages). In this case, the 1st blank page flag is set to Off (Step S304).

If the previous blank page number has been set (Step S301, NO), the current blank page is the increment (+1) of the previous blank page number (Step S305). For example, if the previous blank page number is 1, then the current blank page number is 2. In this case, the 1st blank page flag is set to Off.

7. Process Samples of Checking if Blank Page is within Maximum Allowable Blank Pages FIG. 15 shows a process sample of checking if a blank page is within the maximum allowable blank pages.

In this sample, the maximum allowable blank pages in a set of consecutive blank pages is 2.

Figure 15:
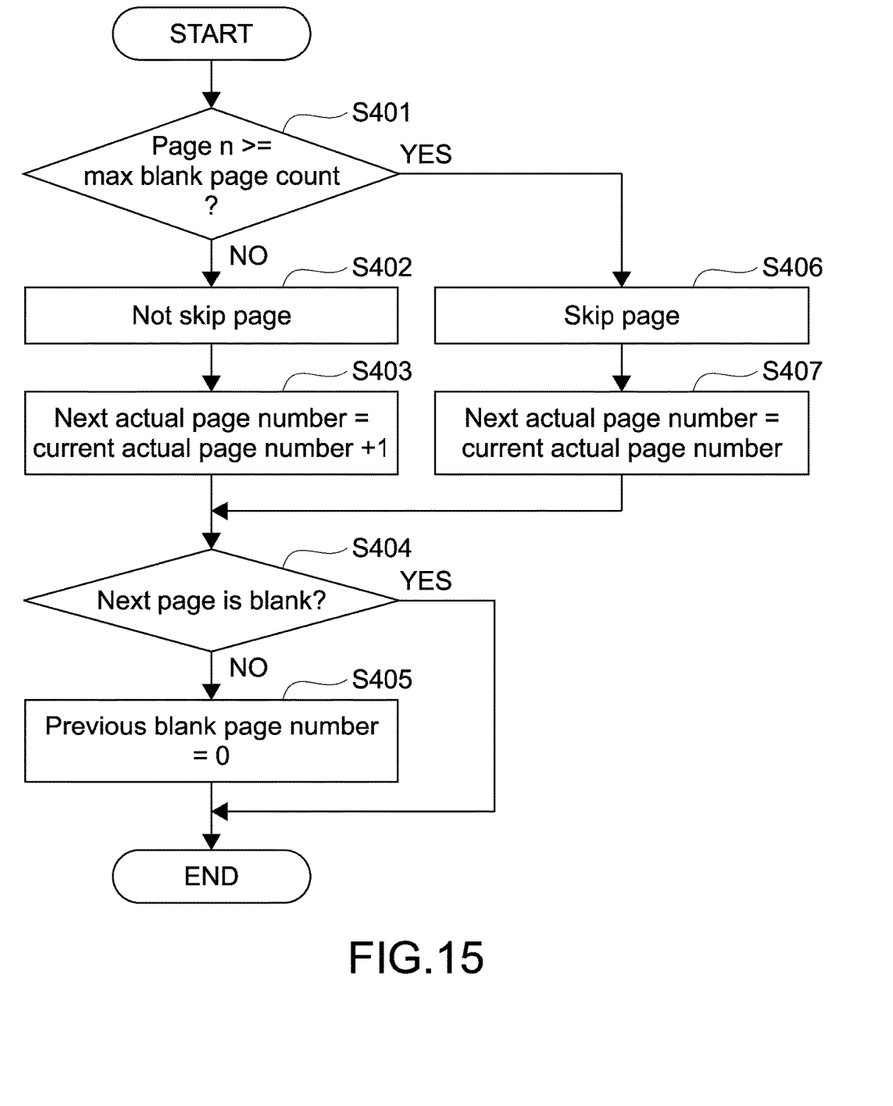
FIG. 15 shows a process sample of checking if a blank page is within the maximum allowable blank pages.

As shown in FIG. 15, if the current blank page number is 2 and the current actual page number is 3, the current blank page number 2 is within the maximum allowable number 2 of consecutive blank pages (Step S401 (same as FIG. 12, Step S108), NO). In this case, the current blank page 2 is not skipped (Step S402). The current actual page number 3 is not changed since the page is not skipped, and the next actual page number is 4 (i.e., current actual page number+1) (Step S403). If the next page is not blank (Step S404, NO), the previous blank page number is reset with 0 (Step S405) since the current blank page is the end of the consecutive blank pages.

Meanwhile, if the current blank page number is 3 and the current actual page number is 5, the current blank page number 3 is not within the maximum allowable number 2 of consecutive blank pages (Step S401 (same as FIG. 12, Step S108), YES). In this case, the current blank page 3 is skipped (Step S406 (same as FIG. 12, Step S109)). The actual page number is still retained to 5 for the next page (Step S407) since the current page is skipped. If the next page is not blank (Step S404, NO), the previous blank page number is reset with 0 (Step S405) since the current blank page is the end of the consecutive blank pages.

8. Sample Page Printout

Figure 16:
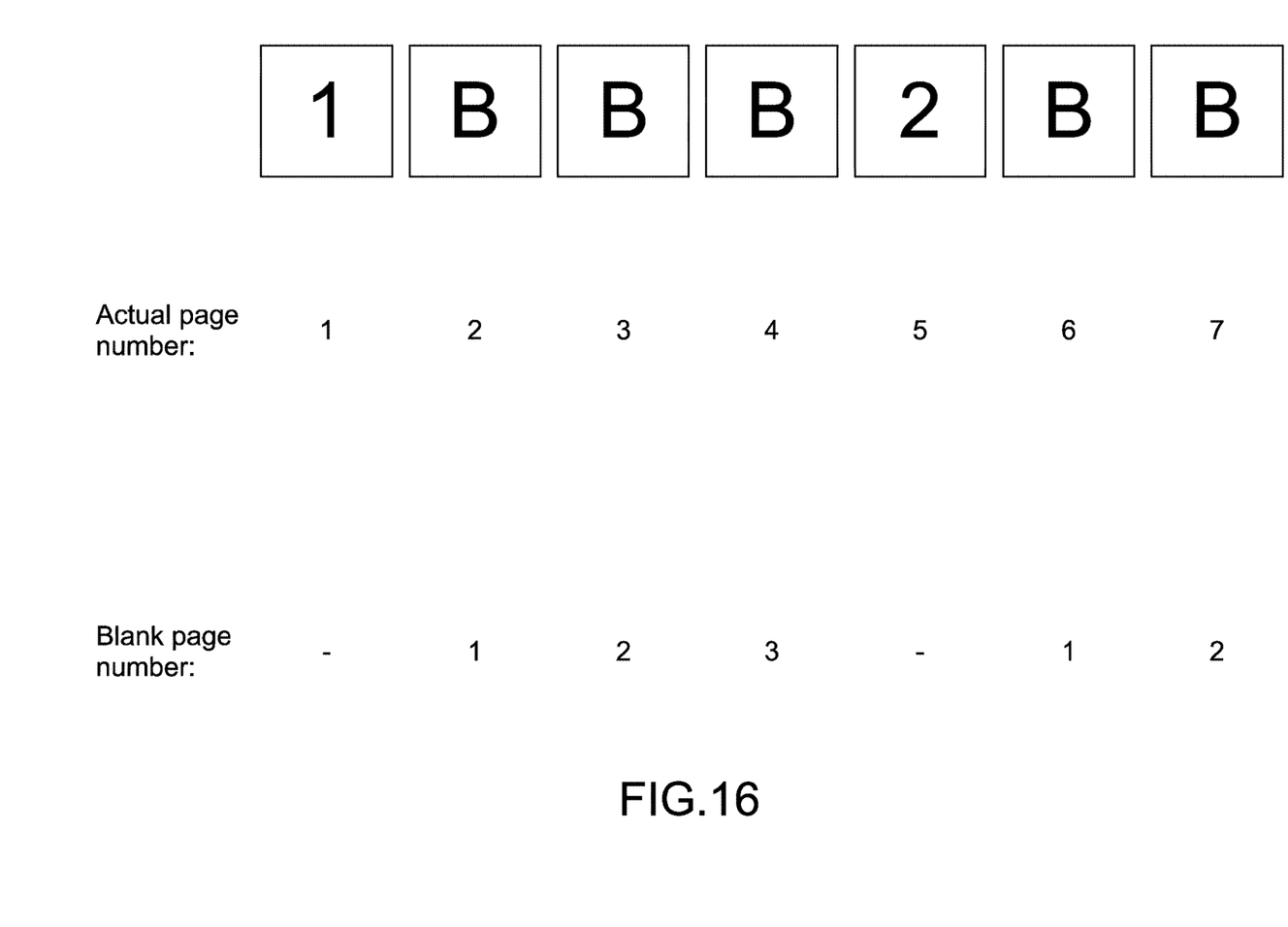
FIG. 16 shows a sample page printout showing actual page numbers and blank page numbers.

FIG. 16 shows a sample page printout showing actual page numbers and blank page numbers.

A sample of a print job includes the page 1 with print data (actual page number: 1, blank page number: X), the blank page B (actual page number: 2, blank page number: 1), the next blank page B (actual page number: 3, blank page number: 2), the further next blank page B (actual page number: 4, blank page number: 3), the page 2 with print data (actual page number: 5, blank page number: X), the blank page B (actual page number: 6, blank page number: 1), and the next blank page B (actual page number: 7, blank page number: 2), in this order.

Actual page number 2 is the 1st blank page of the 1st set of consecutive blank pages in the document. Actual page number 6 is the 1st blank page of the 2nd set of consecutive blank pages in the document.

If the maximum allowable blank pages is set to 1 (Step S107, YES), the blank page handling module 104 determines that the blank page number 1 is within the number of maximum allowable consecutive blank pages 1 (Step S108, NO). To the contrary, the blank page handling module 104 determines that the blank page number 2 or 3 is not within the number of maximum allowable consecutive blank pages 1 (Step S108, YES), and therefore skips the actual page numbers 3, 4, and 7 (Step S109).

As a result, the rendering module 103 of the printer driver 102 draws the specified marking on the blank pages (actual page numbers 2 and 6), and skips the other blank pages (actual page numbers 3, 4, and 7).

9. Conclusion

In the past, marking blank pages can be done manually in editing software but could be cumbersome or time consuming for users to check for all blank pages especially for documents with many pages. Integration of similar features to printer driver can conveniently give users direct access to handling blank pages according to printer support.

According to this embodiment, the blank page handling module 104 allows manipulation of the blank pages according to user preference to affect the blank pages of the actual print output of a document.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus connected to an image forming device through a network, comprising:
   a ROM (Read Only Memory) that stores an OS (Operating System), the OS managing a printer driver program having a rendering module having a blank page handling module;
   a RAM (Random Access Memory);
   a CPU (Central Processing Unit) that loads the printer driver program in the RAM and executes the printer driver program, the CPU including at least one processor, when a document needs to be printed by the image forming device, the CPU executes the printer driver program, the CPU being configured to process all pages of the document by
      setting one, two, or all blank page handling feature/features of
         (1) a maximum consecutive blank page number,
         (2) auto-insertion of marking on an n-th blank page, and
         (3) auto-insertion of marking in all blank pages,
      detecting a blank page/blank pages in the document, and
      handling the detected blank page/blank pages in the document based on the set blank page handling feature/features (1), (2), and/or (3), wherein
   the CPU is further configured to
   if (1) the maximum consecutive blank page number is set,
      if a current blank page number within a consecutive blank pages is not within the maximum consecutive blank page number, skip a current blank page, and determine that a next actual page number is the current actual page number,
      if the current blank page number within the consecutive blank pages is within the maximum consecutive blank page number, avoid to skip the current blank page, and determine that the next actual page number is an increment of the current actual page number, and
      if a next page is not blank, reset a previous blank page number with 0; and a communication unit for sending the document printing job to the image forming device through the network to print out the document after the CPU processes all pages of the document.

2. The information processing apparatus according to claim 1, wherein
when the CPU executes the printer driver program, the CPU is further configured to
if (1) the maximum consecutive blank page number is set,
if a previous blank page number is 0 and if a next page is blank, determine that the current blank page number is 1 and that the current blank page is a part of a set of consecutive blank pages,
if the previous blank page number is 0 and if the next page is not blank, determine that the current blank page number is 1 and that the current blank page is not a part of a set of consecutive blank pages, and
if the previous blank page number is not 0, determine that the current blank page number is an increment of the previous blank page number.

3. The information processing apparatus according to claim 2, wherein
when the CPU executes the printer driver program, the CPU is further configured to
if (2) the auto-insertion of marking on an n-th blank page is set, and
if the current blank page number is the n-th blank page of the consecutive blank pages,
insert the marking in the current blank page.

4. The information processing apparatus according to claim 3, wherein
when the CPU executes the printer driver program, the CPU is further configured to
if (3) the auto-insertion of marking in all blank pages is set,
insert the marking in the current blank page.

5. The information processing apparatus according to claim 4, wherein
when the CPU executes the printer driver program, the CPU is further configured to
if (1) the maximum consecutive blank page number is not set,
check if (2) the auto-insertion of marking on an n-th blank page is set.

6. The information processing apparatus according to claim 5, wherein
when the CPU executes the printer driver program, the CPU is further configured to
if (1) the maximum consecutive blank page number is set, and
if the current blank page number is within the maximum consecutive blank page number,
check if (2) the auto-insertion of marking on an n-th blank page is set.

7. The information processing apparatus according to claim 6, wherein
when the CPU executes the printer driver program, the CPU is further configured to
if (2) the auto-insertion of marking on the n-th blank page is not set,
check if (3) the auto-insertion of marking in all blank pages is set.

8. The information processing apparatus according to claim 7, wherein
when the CPU executes the printer driver program, the CPU is further configured to
if (2) the auto-insertion of marking on the n-th blank page is set, and
if the current blank page number is not the n-th blank page of the consecutive blank pages,
check if (3) the auto-insertion of marking in all blank pages is set.

9. A non-transitory computer readable recording medium that records a printer driver program,
the printer driver program causing a computer, when a document needs to be printed by and an image forming device, which is connected to the computer through a network, and when a CPU of the computer loads the printer driver program in a RAM of the computer and executes the printer driver program, to process all pages of the document by
setting one, two, or all blank page handling feature/features of
(1) a maximum consecutive blank page number,
(2) auto-insertion of marking on an n-th blank page, and
(3) auto-insertion of marking in all blank pages,
detecting a blank page/blank pages in the document, and
handling the detected blank page/blank pages in the document based on the set blank page handling feature/features (1), (2), and/or (3), wherein
the printer driver program further causing the computer to
if (1) the maximum consecutive blank page number is set,
if a current blank page number within a consecutive blank pages is not within the maximum consecutive blank page number, skip a current blank page, and determine that a next actual page number is the current actual page number,
if the current blank page number within the consecutive blank pages is within the maximum consecutive blank page number, avoid to skip the current blank page, and determine that the next actual page number is an increment of the current actual page number, and
if a next page is not blank, reset a previous blank page number with 0; and the printer driver program causing the computer to send the document printing job to the image forming device through the network to print out the document after the computer processes all pages of the document.

10. The non-transitory computer readable recording medium according to claim 9, wherein
the printer driver program further causes the computer to
if (1) the maximum consecutive blank page number is set,
if a previous blank page number is 0 and if a next page is blank, determine that the current blank page number is 1 and that the current blank page is a part of a set of consecutive blank pages,
if the previous blank page number is 0 and if the next page is not blank, determine that the current blank page number is 1 and that the current blank page is not a part of a set of consecutive blank pages, and
if the previous blank page number is not 0, determine that the current blank page number is an increment of the previous blank page number.

11. The non-transitory computer readable recording medium according to claim 10, wherein
the printer driver program further causes the computer to if (2) the auto-insertion of marking on an n-th blank page is set, and
if the current blank page number is the n-th blank page of the consecutive blank pages,
insert the marking in the current blank page.

12. The non-transitory computer readable recording medium according to claim 11, wherein
the printer driver program further causes the computer to
if (3) the auto-insertion of marking in all blank pages is set,
insert the marking in the current blank page.

13. The non-transitory computer readable recording medium according to claim 12, wherein
the printer driver program further causes the computer to
if (1) the maximum consecutive blank page number is not set,
check if (2) the auto-insertion of marking on an n-th blank page is set.

14. The non-transitory computer readable recording medium according to claim 13, wherein
the printer driver program further causes the computer to
if (1) the maximum consecutive blank page number is set, and
if the current blank page number is within the maximum consecutive blank page number,
check if (2) the auto-insertion of marking on an n-th blank page is set.

15. The non-transitory computer readable recording medium according to claim 14, wherein
the printer driver program further causes the computer to
if (2) the auto-insertion of marking on the n-th blank page is not set,
check if (3) the auto-insertion of marking in all blank pages is set.

16. A blank page handling method for printing a document executed by an information processing apparatus and an image forming device connected to the information processing apparatus through a network, the information processing apparatus including a ROM that stores an OS, the OS managing a printer driver program having a rendering module having a blank page handling module, a RAM, and a CPU that loads the printer driver program in the RAM and executes the printer driver program, all pages of the document being processed by the blank page handling method, the blank page handling method comprising:
setting one, two, or all blank page handling feature/features of
(1) a maximum consecutive blank page number,
(2) auto-insertion of marking on an n-th blank page, and
(3) auto-insertion of marking in all blank pages;
detecting a blank page/blank pages in a document of a print job; and
handling the detected blank page/blank pages in the document based on the set blank page handling feature/features (1), (2), and/or (3), wherein
the method further comprises
if (1) the maximum consecutive blank page number is set,
if a current blank page number within a consecutive blank pages is not within the maximum consecutive blank page number, skipping a current blank page, and determining that a next actual page number is the current actual page number,
if the current blank page number within the consecutive blank pages is within the maximum consecutive blank page number, avoiding to skip the current blank page, and determining that the next actual page number is an increment of the current actual page number, and
if a next page is not blank, resetting a previous blank page number with 0;
after all pages of the document are processed, finalizing the document printing job and releasing the document printing job to the image forming device to print out the document.

17. The blank page handling method according to claim 16, further comprising:
if (1) the maximum consecutive blank page number is set,
if a previous blank page number is 0 and if a next page is blank, determining that the current blank page number is 1 and that the current blank page is a part of a set of consecutive blank pages;
if the previous blank page number is 0 and if the next page is not blank, determining that the current blank page number is 1 and that the current blank page is not a part of a set of consecutive blank pages; and
if the previous blank page number is not 0, determining that the current blank page number is an increment of the previous blank page number.

* * * * *